United States Patent
Yakuwa et al.

(10) Patent No.: US 11,431,594 B2
(45) Date of Patent: Aug. 30, 2022

(54) PART EXTRACTION DEVICE, PART EXTRACTION METHOD AND RECORDING MEDIUM

(71) Applicant: NEC Corporation, Tokyo (JP)

(72) Inventors: Yutaka Yakuwa, Tokyo (JP); Takayuki Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/205,646

(22) Filed: Mar. 18, 2021

(65) Prior Publication Data

US 2021/0306237 A1    Sep. 30, 2021

(30) Foreign Application Priority Data

Mar. 31, 2020  (JP) .............................. JP2020-065028

(51) Int. Cl.
*G06F 15/173* (2006.01)
*H04L 43/045* (2022.01)

(52) U.S. Cl.
CPC ................................. *H04L 43/045* (2013.01)

(58) Field of Classification Search
CPC .................................................... H04L 43/045
See application file for complete search history.

(56) References Cited

U.S. PATENT DOCUMENTS

| | | | | |
|---|---|---|---|---|
| 5,394,522 A * | 2/1995 | Sanchez-Frank | ....... | H04L 29/00 715/735 |
| 5,825,361 A * | 10/1998 | Rubin | ..................... | H04L 41/22 715/839 |
| 2009/0094521 A1 * | 4/2009 | Hung | .................. | H04L 41/0846 715/736 |
| 2009/0113383 A1 * | 4/2009 | Delima | ..................... | G06F 8/10 717/105 |
| 2009/0216867 A1 * | 8/2009 | Pusateri | ................ | H04L 41/085 709/222 |
| 2010/0306275 A1 * | 12/2010 | Maheshwari | ....... | G06F 11/0709 707/803 |
| 2015/0049641 A1 * | 2/2015 | Pugaczewski | ...... | H04L 12/4641 370/254 |
| 2015/0363196 A1 | 12/2015 | Carback et al. | | |
| 2019/0220778 A1 | 7/2019 | Murano et al. | | |

FOREIGN PATENT DOCUMENTS

| | | |
|---|---|---|
| JP | 2017-519300 A | 7/2017 |
| WO | 2015/191731 A1 | 12/2015 |
| WO | 2018/066074 A1 | 4/2018 |
| WO | 2019/216082 A1 | 11/2019 |

OTHER PUBLICATIONS

Yoshua Bengio et al., Curriculum Learning, In International Conference on Machine Learning, pp. 41-48, ACM, 2009.

Takashi Maruyama et al., Acceralated Search for Search-Based Network Design Generation Scheme with Reinforcement Learning, IEICE Technical Report, vol. 118, No. 483, ICM2018-71, pp. 123-128,2019. 03, including abstract in front page, JAPAN.

* cited by examiner

Primary Examiner — Padma Mundur
(74) Attorney, Agent, or Firm — Sughrue Mion, PLLC

(57) ABSTRACT

A part extraction device includes: at least one memory configured to store instructions; and at least one processor configured to execute the instructions to: acquire first information that shows a configuration of a system in a graph format; and extract second information that shows a configuration of a part of the system in a graph format, from the first information.

6 Claims, 14 Drawing Sheets

PART EXTRACTION DEVICE, PART EXTRACTION METHOD AND RECORDING MEDIUM

This application is based upon and claims the benefit of priority from Japanese patent application No. 2020-065028 filed on Mar. 31, 2020, the disclosure of which is incorporated herein in its entirety by reference.

TECHNICAL FIELD

The present invention relates to a part extraction device, a part extraction method and a recording medium.

BACKGROUND ART

Software may be divided into multiple parts, and each divided part may be designed or developed. Regarding the division of software, PCT International Publication No. WO 2018/066074 (hereinafter Patent Document 1) describes an information processing device that divides a program into program elements such as functions, and groups the program elements into a plurality of groups based on a relationship of access to an array between the program elements.

Further, Published Japanese Translation No. 2017-519300 of the PCT International Publication (hereinafter Patent Document 2) describes a method of accessing a database having an artifact of a software file, and specifying a design pattern of the software file based on the artifact.

In the technique described in PCT International Publication No. WO 2019/216082 (hereinafter Patent Document 3), a concretization rule prescribed by a method of concretizing abstract configuration information by determining an undefined portion of information (abstract configuration information) indicating the configuration of a system including the undefined portion, is stored in a storage unit. Then the abstract configuration information included in the configuration requirements of the system expressed in graph format, is concretized by using the stored concretization rule. As a result, system configuration information, which is information showing the configuration of a system that does not include the undefined portion is generated, based on the configuration requirements.

Y. Bengio, 3 others, "Curriculum learning", In International Conference on Machine Learning, pp. 41-48, ACM, 2009 (hereinafter Non-Patent Document 1) discloses curriculum reinforcement learning. Curriculum reinforcement learning is a technique for learning efficiently by going through an approach of learning from simple problems in order, instead of learning difficult problems to be solved from the beginning. Such curriculum reinforcement learning is a means to solve a problem that, due to the large number of possible solution patterns, the frequency of rewards obtained even after repeated learning is low, so that a method for obtaining an appropriate solution cannot be learned well.

Takashi Maruyama, 4 others, "Acceralated Search for Search Based Network Design Generation Scheme with Reinforcement Learning", IEICE Technical Report, vol. 118, no. 483, ICM2018-71, pp. 123-128, March 2019 (hereinafter Non-Patent Document 2) discloses a technique for efficiently generating system configuration information, by selecting a promising method using the results learned by reinforcement learning, in selecting one of the numerous choices for determining the undefined portion, in the technique shown in Patent Document 3.

SUMMARY

From the viewpoint of simplifying individual designs, it is preferable that the scale of each design target can be made relatively small, even in system design including hardware design as well as software design, for example by dividing up the system to be designed.

An example object of the present invention is to provide a part extraction device, a part extraction method, and a recording medium capable of solving the above-mentioned problems.

According to a first example aspect of the present invention, a part extraction device includes: at least one memory configured to store instructions; and at least one processor configured to execute the instructions to: acquire first information that shows a configuration of a system in a graph format; and extract second information that shows a configuration of a part of the system in a graph format, from the first information.

According to a second example aspect of the present invention, a part extraction method includes: acquiring first information that shows a configuration of a system in a graph format; and extracting second information that shows a configuration of a part of the system in a graph format, from the first information.

According to a third example aspect of the present invention, a non-transitory computer readable recording medium stores a program for causing a computer to execute: acquiring first information that shows a configuration of a system in a graph format; and extracting second information that shows a configuration of a part of the system in a graph format, from the first information.

According to some example embodiments of the present invention, in system design including hardware design, the scale of each design target can be made relatively small.

EXAMPLE EMBODIMENT

The applicant, for example, in Patent Document 3, proposes a technique for automatically designing a system. In addition, the present inventors, for example, in Non-Patent Document 2, propose a technique for applying machine learning to automatic design of a system. In this case, in the automatic design of a system, there is a problem that the probability of a successful design when performing reinforcement learning is small, and the frequency of rewards obtained is very low, due to the condition that the design scale of the product level system is huge. Therefore there is a problem that learning does not proceed well. In this case, as referred to in the background art section, it is assumed that curriculum reinforcement learning will be used. However, even if the system requirements are blindly divided for the purpose of generating system requirements that are relatively easy to learn, system requirements that are worth learning cannot be generated. On the other hand, the present inventors have made a finding that automatically generates from the original system requirement, a system requirement that is worth learning based on the know-how of the designer. The present invention based on such findings will be described in detail by exemplifying the example embodiments disclosed below.

Hereinafter, example embodiments of the present invention will be described, but the following example embodiments do not limit the invention as claimed. Also, all combinations of features described in the example embodiments may not be essential to the means of solving the invention.

Figure 1:
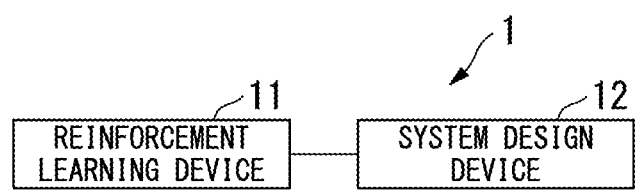
FIG. 1 is a schematic configuration diagram showing an example of a device configuration of a design system according to an example embodiment.

FIG. 1 is a schematic configuration diagram showing an example of a device configuration of a design system according to the example embodiment. In the configuration shown in FIG. 1, the design system 1 includes a reinforcement learning device 11 and a system design device 12.

The design system 1 automatically or semi-automatically designs the system. Specifically, the system design device 12 acquires the system requirement (one set of system requirements) of the system to be designed. The system requirement referred to here is information that describes the configuration that the design target system should have. In the system requirement input to the system design device 12, it is possible to abstractly describe the components of the system to be designed. On the other hand, the system design device 12 concretizes the system requirement to a level at which the system can be deployed, by repeatedly applying a predetermined conversion rule to the acquired system requirement.

Figure 2:
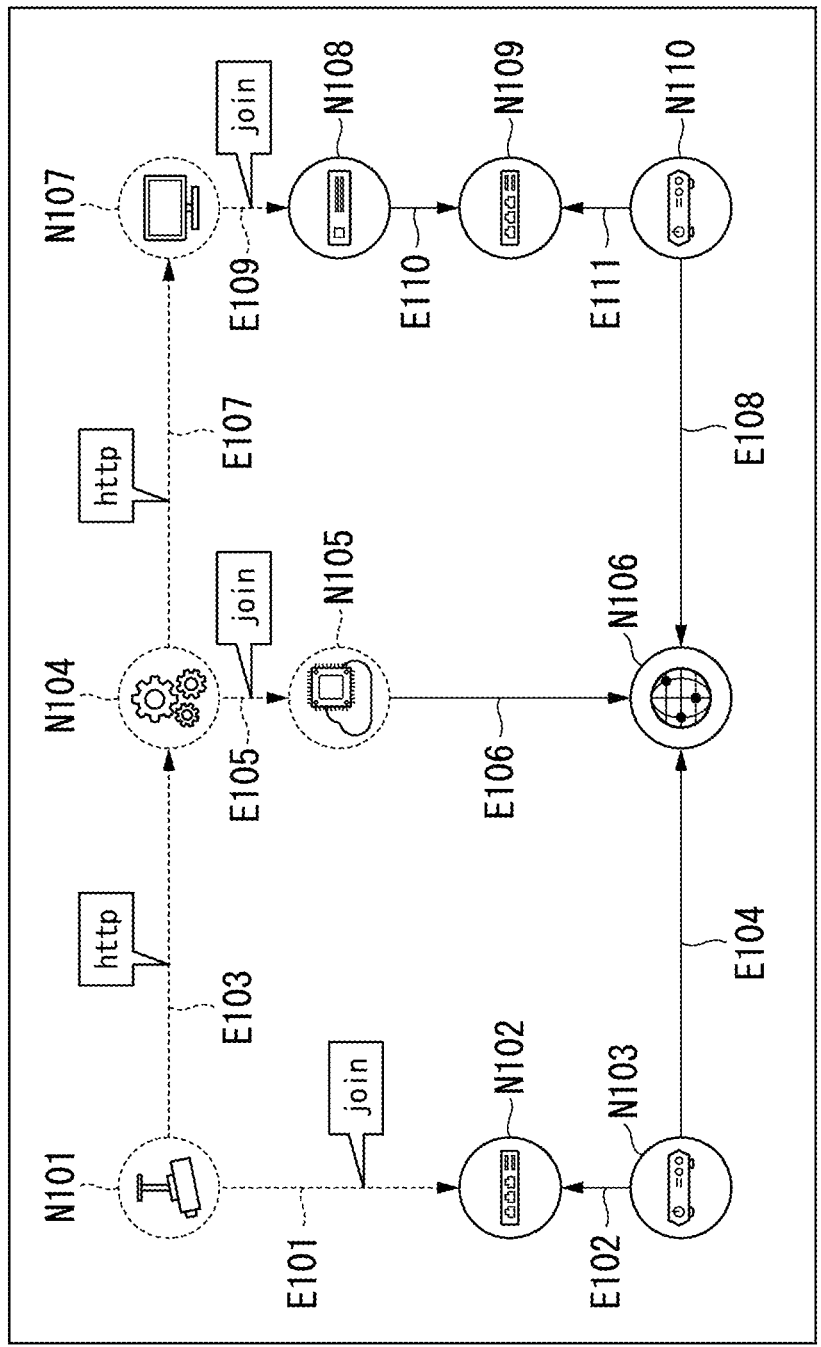
FIG. 2 is a diagram showing an example of a system requirement handled by the design system according to the example embodiment.

FIG. 2 is a diagram showing an example of a system requirement handled by the design system 1. FIG. 2 shows an example of a system requirement to be designed when the design system 1 designs a suspicious person detection system.

As in the example of FIG. 2, the system requirement handled by the design system 1 is described in a graph format. In the described graph, attribute information can be added to any of the nodes and edges.

For example, the name or identification information of the function or device indicated by the node may be added to the node as attribute information. In the case of the example of FIG. 2, the node N101 represents a camera function (shooting function). Nodes N102 and N109 both represent network switches. Nodes N103 and N110 both represent routers. Node N104 represents a face recognition function. Node N105 represents a cloud infrastructure. Node N106 represents a WAN (Wide Area Network). Node N107 represents a monitor function (image display function). Node N108 represents a server device.

Further, the degree of abstraction of the node may be added to the node as attribute information. In the case of the example of FIG. 2, the nodes N101, N104, N105, and N107 are abstract nodes. On the other hand, the nodes N102, N103, N106, N108, N109, and N110 are concrete nodes. Here, the abstract node is a node that can be converted into a node that represents a more specific configuration than the present, by referring to a predetermined conversion rule at least once. On the other hand, a concrete node is a node that cannot be converted into a node representing a specific configuration even if the conversion rule is referred to.

The system design device 12 applies the conversion rule to the system requirement so as to concretize an abstract node. For example, the system design device 12 may apply a conversion rule that converts the node N101 representing a camera function in the system requirement illustrated in FIG. 2, into a partial graph (Subgraph) that includes a node of a camera (imaging device), and a node of a control device that controls the camera.

Further, in the example of FIG. 2, the attribute information "join" of each of the edges E101, E106, and E109, and the attribute information "http" of each of the edges E103 and E107 are shown. The attribute information "join" indicates the affiliation relationship. For example, the camera function indicated by the node N101 is included in the LAN (Local Area Network) formed by the network switch indicated by the node N102. The face recognition function indicated by the node N104 is provided on the cloud platform indicated by the node N105. The monitor function indicated by the node N107 is controlled by using the server device indicated by the node N108.

The attribute information "http" indicates communication using HTTP (Hyper Text Transfer Protocol). For example, the edge E103 indicates that data is transmitted by HTTP from the camera function indicated by the node N101 to the face recognition function indicated by the node N105. The edge E107 indicates that data is transmitted by HTTP from the face authentication function indicated by the node N105 to the monitor function indicated by the node N107.

It should be noted that it is not essential that the edges have an orientation (in the example of FIG. 2, the edges are indicated by arrows) in the system requirement used by the design system 1. For example, the system requirement may be shown using an undirected graph.

Further, the degree of abstraction of the edge may be added to the edge as attribute information. In the case of the example of FIG. 2, the edges E101, E103, E105, E107, and E109 are abstract edges. On the other hand, the edges E102, E104, E106, E108, E110, and E111 are concrete edges. Here, the abstract edge is an edge that can be converted into an edge that represents a more specific configuration than the present, by referring to a predetermined conversion rule at least once. On the other hand, the concrete edge is an edge that cannot be further converted into an edge representing a specific configuration even if the conversion rule is referred to.

The conversion rules used by the design system 1 may include conversion rules that concretize the edges.

Figure 3:
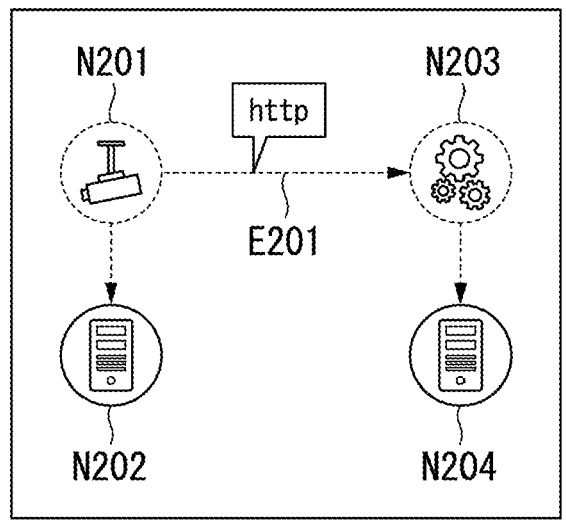
FIG. 3 is a diagram showing an example of a system requirement before applying a conversion rule according to the example embodiment.

FIG. 3 is a diagram showing an example of a system requirement before applying the conversion rule.

In the system requirements shown in FIG. 3, the camera function indicated by node N201 is connected to the workstation indicated by node N202. Further, the face recognition function indicated by the node N203 is executed on the workstation indicated by the node N204. It is assumed that the edge E201 indicates that data is transmitted by HTTP from the camera function indicated by the node N201 to the face authentication function indicated by the node N203.

Figure 4:
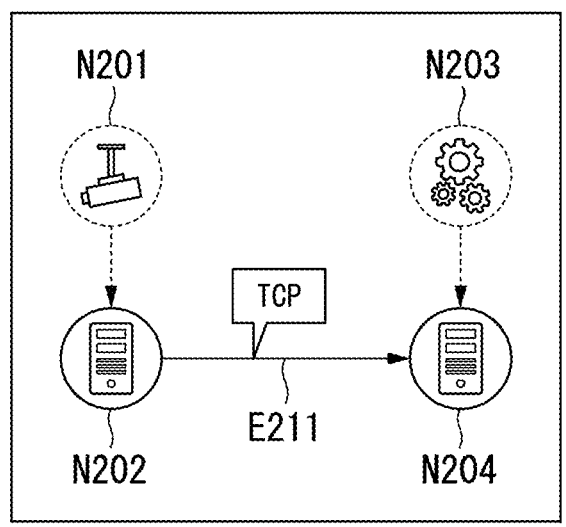
FIG. 4 is a diagram showing an example of a system requirement after applying a conversion rule according to the example embodiment.

FIG. 4 shows an example of a system requirement after applying a conversion rule. FIG. 4 shows an example of applying a conversion rule to the system requirement shown in FIG. 3.

In FIG. 4, an edge E211 is provided instead of the edge E201 of FIG. 3. It is assumed that the edge E211 indicates that data is transmitted from the workstation indicated by the node N202 to the workstation indicated by the node N204 by using TCP (Transmission Control Protocol). That is, FIG. 4 shows that by applying the conversion rule to the system requirement of FIG. 3, the communication using HTTP is concretized and converted into communication using TCP.

Of the plurality of predetermined conversion rules, an event occurs in which the contents (configuration) represented by the post conversion system requirement is different depending on which conversion rule the system design device 12 applies to the system requirement, and further depending on the order in which the system design device 12 applies the plurality of conversion rules to the system requirement. In particular, depending on the conversion rules applied to the system requirement and depending on the order in which the plurality of conversion rules are applied to the system requirement, the system design device 12 may or may not succeed in designing the system. In other words, the purpose of the system design device 12 is to concretize the system requirement to a level at which the system can be deployed. However, in the system design device 12, even though some of the components of the system are still described in an abstract manner, the fact that there are no more applicable conversion rules means that there is a failure of the system design by the system design device 12. This will be further described with reference to FIG. 5.

Figure 5:
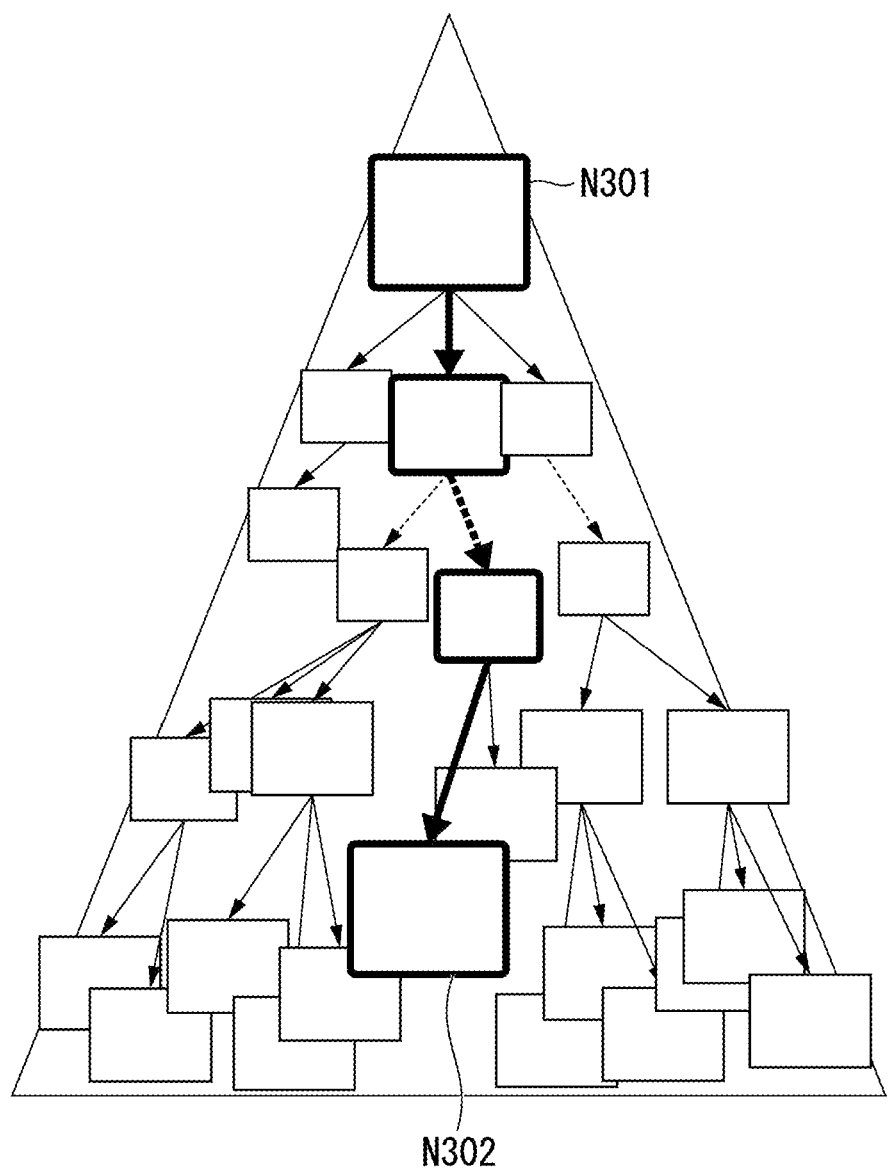
FIG. 5 is a diagram showing an example of branching of conversion rule application in system design performed by a system design device according to the example embodiment.

FIG. 5 is a diagram showing an example of branching of conversion rule application in the system design performed by the system design device 12.

Each node in the tree shown in FIG. 5 indicates one system requirement. In this case, the edge indicates the conversion rule that is applied to the system requirement. Note that in order to make the figure easier to see, representation of a part of the tree is omitted and the omitted part is shown by the edge of the broken line.

In the example of FIG. 5, the appearance of a plurality of edges from one node indicates that there are a plurality of conversion rules applicable to the system requirement indicated by the one node, in the plurality of predetermined conversion rules.

Node N301, which is the root, indicates the system requirement input to the system design device 12. Leaf indicates a system requirement for which there are no applicable conversion rules. As the tree in FIG. 5 has multiple leaves, the system requirement obtained as the result of the system design is different depending on which conversion rule is applied to the system requirement, and further depending on the order in which the multiple conversion rules are applied to the system requirement.

When the system design device 12 acquires the system requirement indicated by the node N302, and the system requirement does not include an abstract part, the system design device 12 has succeeded in system design. On the other hand, when the system requirement indicated by the node N302 includes an abstract part, the system design device 12 fails in the system design because there is no conversion rule that can concretize the abstract part.

In order to increase the possibility that the system design device 12 succeeds in the system design, the reinforcement learning device 11 provides an evaluation model for the system design device 12 to select the conversion rule applied to the system requirement. For example, the reinforcement learning device 11 provides the system design device 12 with an evaluation model that receives an input of a system requirement and outputs an evaluation value of the possibility of success in system design.

The evaluation model used by the design system 1 is not limited to the model of a specific method. For example, the evaluation model may be constructed using a neural network (NN), but is not limited thereto.

The system design device 12 calculates the converted system requirement for each conversion rule applicable to the current system requirement, inputs the calculated system requirement into the evaluation model, and calculates the evaluation value for each conversion rule. The system design device 12 preferentially selects a conversion rule having a high evaluation (high evaluation value).

The system design device 12 may select any one of the plurality of conversion rules so as to reach one node from one node. That is, the system design device 12 may apply one conversion rule to one system requirements to acquire one converted system requirement.

Alternatively, the system design device 12 may allow itself to reach a plurality of nodes from one node, such as allowing the system design device 12 to select up to five conversion rules. That is, the system design device 12 may apply a plurality of conversion rules to one system requirement, and acquire a plurality of converted system requirements (converted system requirements for each conversion rule).

The reinforcement learning device 11 and the system design device 12 may be configured by using a computer such as a personal computer (PC) or a workstation (Workstation), respectively. Alternatively, either one or both of the reinforcement learning device 11 and the system design device 12 may be configured by using dedicated hardware such as being configured by using an ASIC (Application Specific Integrated Circuit).

Figure 6:
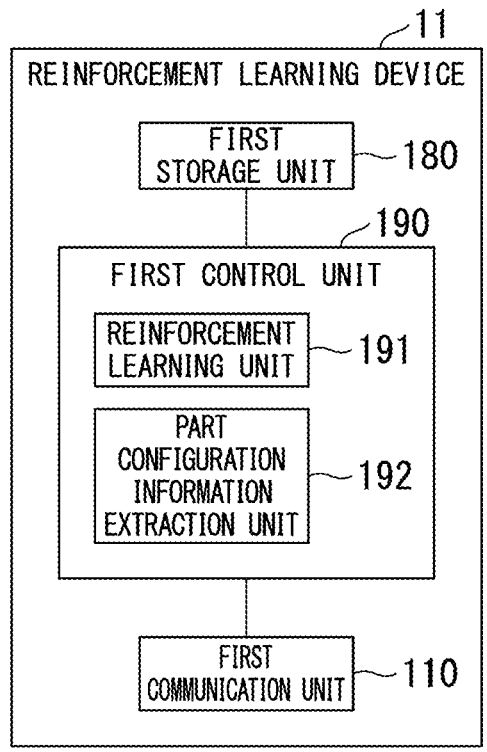
FIG. 6 is a schematic block diagram showing an example of a functional configuration of a reinforcement learning device according to the example embodiment.

FIG. 6 is a schematic block diagram showing an example of the functional configuration of the reinforcement learning device 11. In the configuration shown in FIG. 6, the reinforcement learning device 11 includes a first communication unit 110, a first storage unit 180, and a first control unit 190. The first control unit 190 includes a reinforcement learning unit 191 and a part configuration information extraction unit 192.

The first communication unit 110 communicates with other devices. In particular, the first communication unit 110 transmits the above-mentioned evaluation model to the system design device 12.

The first storage unit 180 stores various data. The first storage unit 180 is configured by using a storage device included in the reinforcement learning device 11.

The first control unit 190 controls each unit of the reinforcement learning device 11 to execute various processes. The function of the first control unit 190 is executed by the CPU (Central Processing Unit) included in the reinforcement learning device 11, reading a program from the first storage unit 180 and executing the program.

The reinforcement learning unit 191 acquires the above evaluation model. Specifically, the reinforcement learning unit 191 learns the evaluation model by reinforcement learning. In the reinforcement learning performed by the reinforcement learning unit 191, the agent performs a system design in which conversion rules are repeatedly applied to the system requirement in the same manner as the system design performed by the system design device 12. The agent is rewarded for successful system design.

On the other hand, it was found that if the agent succeeds in system design infrequently, the rewards become sparse (that is, the frequency of getting the reward becomes low) and learning does not proceed easily. For example, when the scale of the system to be designed is large, the number of times the conversion rule is applied to the system requirement in one system design increases. Moreover the agent fails the system design relatively frequently, and the reward becomes sparse.

Therefore, the reinforcement learning device 11 performs learning in a plurality of stages, such as learning the evaluation model with a relatively simple system design and then learning the evaluation model with a more complicated system design.

The reinforcement learning unit 191 outputs the system requirement to the part configuration information extraction unit 192 in order to learn the evaluation model by a relatively simple system design. The part configuration information extraction unit 192 generates a system requirement indicating a part of the system indicated by the acquired system requirement, such as by dividing up the system configuration indicated by the acquired system requirement, and outputs the generated system requirement to the reinforcement learning unit 191. It is expected that this will simplify the system to be designed, increase the frequency of successful system design by the agent, and advance learning.

The system part is also called a subsystem.

The system requirement indicating the system a part of which is to be extracted by the part configuration information extraction unit 192 (that is, the system requirement acquired by the part configuration information extraction unit 192 from the reinforcement learning unit 191) is also referred to as first information. The system requirement indicating the part extracted by the part configuration information extraction unit 192 (that is, the system requirement output by the part configuration information extraction unit 192 to the reinforcement learning unit 191) is referred to as second information.

In this way, the reinforcement learning unit 191 acquires the first information and outputs it to the part configuration information extraction unit 192. The reinforcement learning unit 191 corresponds to an example of the configuration information acquisition means. Further, the part configuration information extraction unit 192 extracts the second information which graphically shows the configuration of the part of the system indicated by the first information. The part configuration information extraction unit 192 corresponds to an example of the part configuration information extraction means.

The reinforcement learning device 11 corresponds to an example of the part extraction device.

Figure 7:
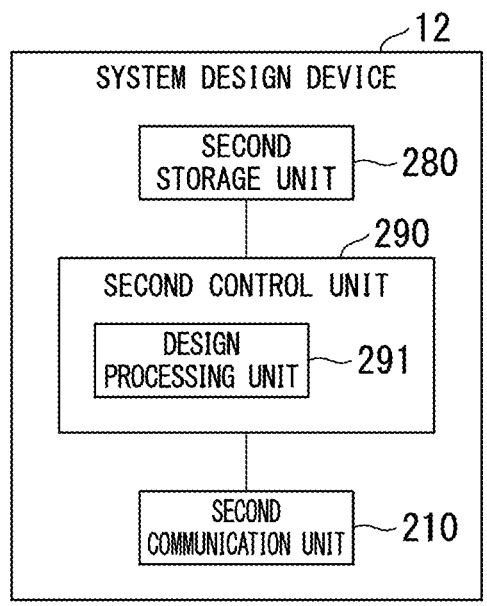
FIG. 7 is a schematic block diagram showing an example of a functional configuration of the system design device according to the example embodiment.

FIG. 7 is a schematic block diagram showing an example of the functional configuration of the system design device 12. In the configuration shown in FIG. 7, the system design device 12 includes a second communication unit 210, a second storage unit 280, and a second control unit 290. The second control unit 290 includes a design processing unit 291.

The second communication unit 210 communicates with other devices. In particular, the second communication unit 210 receives the evaluation model described above from the reinforcement learning device 11.

The second storage unit 280 stores various data. The second storage unit 280 is configured by using the storage device included in the system design device 12.

The second control unit 290 controls each unit of the system design device 12 to execute various processes. The function of the second control unit 290 is executed by the CPU included in the system design device 12, reading a program from the second storage unit 280 and executing the program.

The design processing unit 291 performs the system design described above. Specifically, the design processing unit 291 receives input of the system requirement of the design target system, and repeats the process of selecting one of a plurality of predetermined conversion rules using the evaluation model and applying the conversion rule to the system requirement. As a result, the design processing unit 291 concretizes the system requirement.

As described above, when the system requirement is concretized at a level at which the system can be deployed, the design processing unit 291 has succeeded in system design. On the other hand, if there are no conversion rules applicable to the system requirement while the system requirement includes an abstract part, the design processing unit 291 has failed in the system design.

Figure 8:
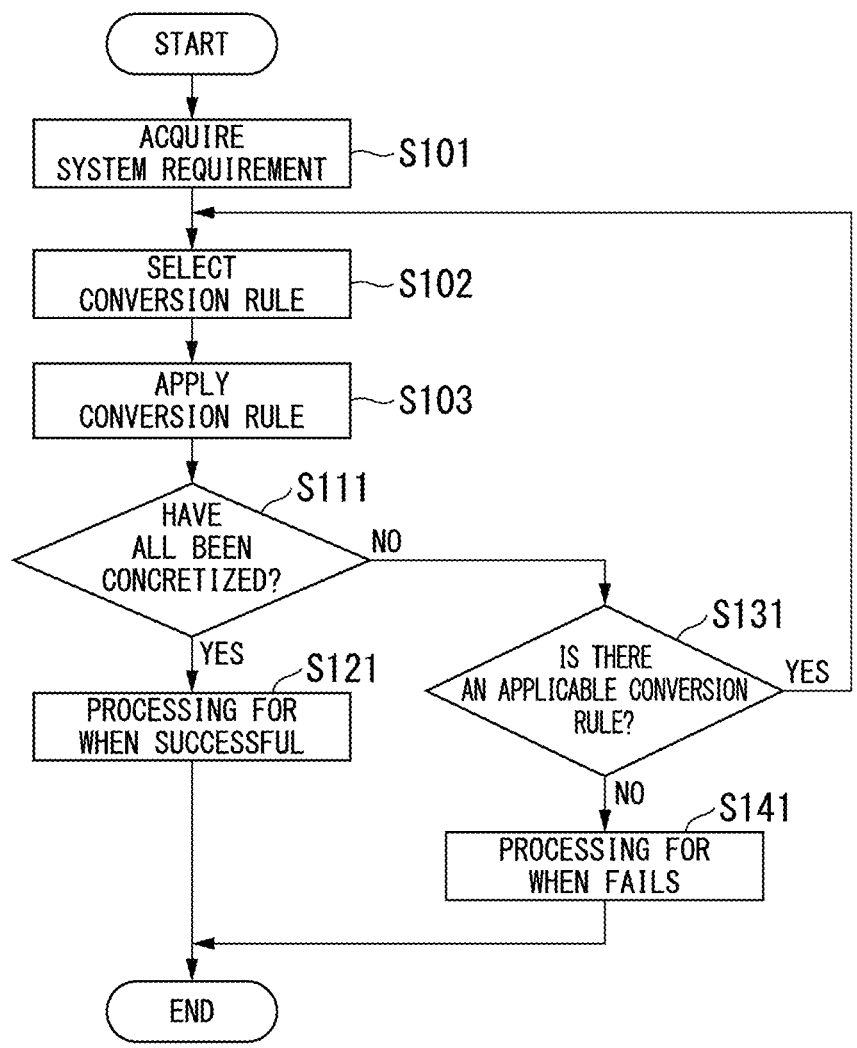
FIG. 8 is a flowchart showing an example of a processing procedure in which the system design device according to the example embodiment designs a system.

FIG. 8 is a flowchart showing an example of a processing procedure in which the system design device 12 designs the system.

In the process of FIG. 8, the design processing unit 291 acquires the system requirement of the design target system (step S101).

Then, the design processing unit 291 selects a conversion rule to be applied to the system requirement (step S102). As described above, the design processing unit 291 calculates the converted system requirement for each conversion rule applicable to the current system requirement, inputs the calculated system requirement into the evaluation model, and calculates an evaluation value for each conversion rule. The design processing unit 291 preferentially selects a conversion rule having a high evaluation (high evaluation value). The design processing unit 291 may select one of the conversion rules stochastically so that the conversion rule having a higher evaluation is selected with a high probability.

Next, the design processing unit 291 executes the conversion of the system requirement, by applying the selected conversion rule to the system requirement (step S103). As a result, the design processing unit 291 performs the conversion so as to concretize the system requirement.

Next, the design processing unit 291 determines whether or not all the system requirement has been concretized (step S111). For example, the design processing unit 291 refers to the attribute information added to the nodes and edges of the graph describing the system requirement, and determines whether or not an abstract node or an abstract edge remains. If it is determined that no abstract nodes or edges remain, the design processing unit 291 determines that all the system requirement has been concretized. On the other hand, if it is determined that an abstract node or edge remains, the design processing unit 291 determines that a portion that is not concretized in the system requirement remains.

When it is determined that all the system requirement has been concretized (step S111: YES), the system design device 12 performs a predetermined process as a process when the system design is successful (step S121). For example, the system design device 12 may include a display screen and display the obtained system requirement (concretized system requirement).

After step S121, the system design device 12 ends the process of FIG. 8.

On the other hand, when it is determined in step S111 that a part not concretized in the system requirement remains (step S111: NO), the design processing unit 291 determines whether or not there is a conversion rule applicable to the system requirement (current system requirement) (step S131).

When the design processing unit 291 determines that there is an applicable conversion rule (step S131: YES), the processing returns to step S102.

On the other hand, if it is determined in step S131 that there is no applicable conversion rule (step S131: NO), the system design device 12 executes a predetermined process as a process when the system design fails (step S141). For example, the system design device 12 may recursively execute the process of FIG. 8 by using the system requirement acquired in step S101. In step S102, the design processing unit 291 stochastically selects the conversion rule, so that a different design result may be obtained from the same system requirement, and the system design device 12 is able to succeed in the follow-up system design.

After step 141, the system design device 12 ends the process of FIG. 8.

Figure 9:
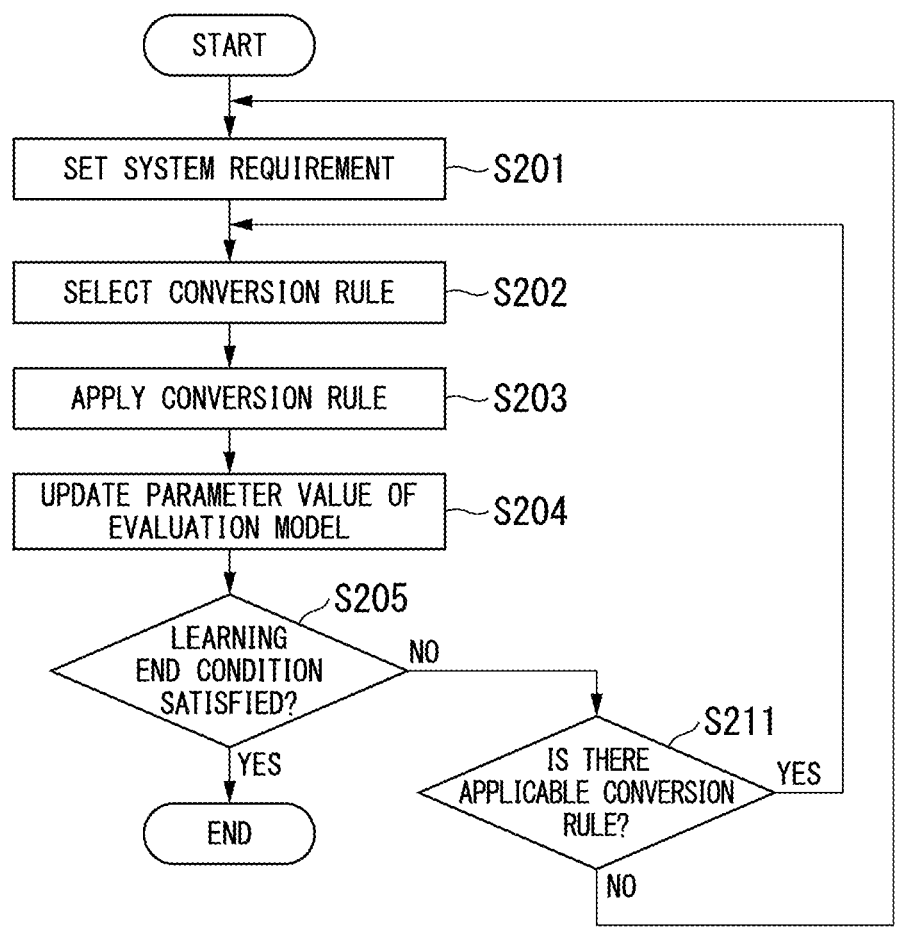
FIG. 9 is a flowchart showing an example of a processing procedure in which the reinforcement learning device according to the example embodiment learns an evaluation model.

FIG. 9 is a flowchart showing an example of a processing procedure in which the reinforcement learning device 11 learns the evaluation model.

In the process of FIG. 9, the reinforcement learning unit 191 sets one system requirement in the initial state of the system design (step S201). For example, each time the reinforcement learning unit 191 performs the process of step S201, one of a plurality of system requirements given for reinforcement learning may be selected and set.

As in the case of the system design of the system design device 12 described with reference to FIG. 8, if the reinforcement learning unit 191 stochastically selects the conversion rule applied to the system requirement, a different design result is obtained from the same system requirement. Therefore, the reinforcement learning unit 191 may repeatedly set the same system requirement in the process of step S201.

Next, the reinforcement learning unit 191 selects a conversion rule to be applied to the system requirement (step S202). Specifically, the reinforcement learning unit 191 calculates the converted system requirement for each conversion rule applicable to the current system requirement, inputs each of the calculated system requirements into the evaluation model, and calculates an evaluation value for each conversion rule. The reinforcement learning unit 191 preferentially selects a conversion rule having a high evaluation (high evaluation value). The reinforcement learning unit 191 selects one of the conversion rules stochastically so that the conversion rule having a higher evaluation is selected with a high probability.

Next, the reinforcement learning unit 191 executes the conversion of the system requirement by applying the selected conversion rule to the system requirement (step S203). As a result, the reinforcement learning unit 191 performs the conversion so as to concretize the system requirement.

Then, the reinforcement learning unit 191 updates the parameter value of the evaluation model (step S204). The reinforcement learning unit 191 updates the parameter value by the reinforcement learning method, assuming that a reward is given when the system design is successful and no reward is given in other cases.

Next, the reinforcement learning unit 191 determines whether or not a predetermined learning end condition is satisfied (step S205). Various conditions can be used as the learning end condition here. For example, the learning end condition may be "the reinforcement learning unit 191 has succeeded in system design more than a predetermined number of times". Alternatively, the learning end condition may be "the reinforcement learning unit 191 has performed the processes of steps S202 to S204 a predetermined number of times or more".

When it is determined that the learning condition is satisfied (step S205: YES), the reinforcement learning device 11 ends the process of FIG. 9.

On the other hand, when it is determined in step S205 that the learning end condition is not satisfied (step S205: NO), the reinforcement learning unit 191 determines whether or not there is a conversion rule applicable to the system requirement (current system requirement) (step S211).

When the reinforcement learning unit 191 determines that there is an applicable conversion rule (step S211: YES), the process returns to step S202. In this case, the system design is not completed, and the reinforcement learning unit 191 continues to design the system and learn the evaluation model.

On the other hand, if the reinforcement learning unit 191 determines in step S211 that there is no applicable conversion rule (step S211: NO), the process returns to step S201. In this case, the system design is completed, and the reinforcement learning unit 191 performs a new system design and learns the evaluation model.

Figure 10:
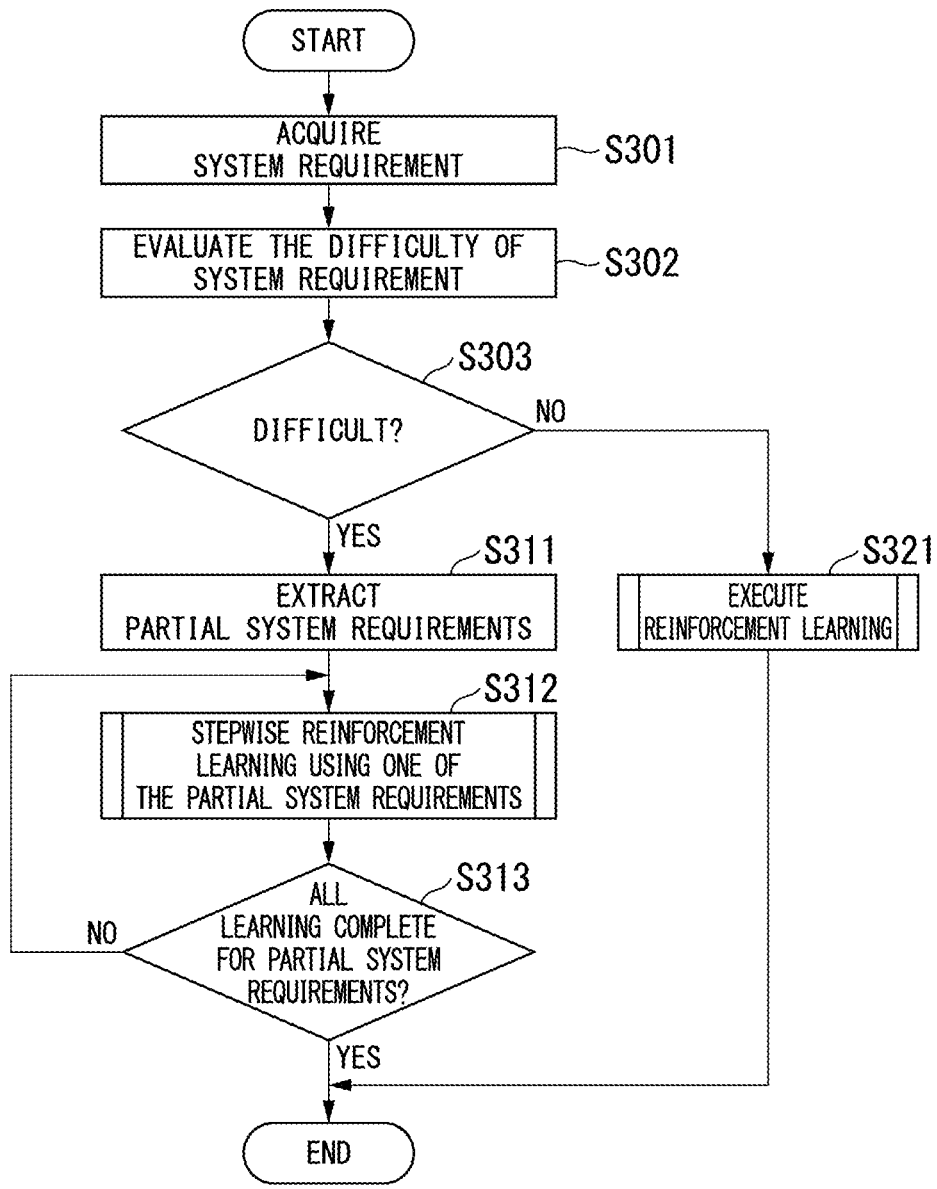
FIG. 10 is a flowchart showing an example of a processing procedure in which the reinforcement learning device according to the example embodiment learns the evaluation model step by step.

FIG. 10 is a flowchart showing an example of a processing procedure in which the reinforcement learning device 11 learns the evaluation model step by step. FIG. 10 shows an example in which the reinforcement learning device 11 acquires one system requirement. When the reinforcement learning device 11 acquires a plurality of system requirements as learning data, the processing of FIG. 10 may be performed for each of the obtained system requirements.

In the process of FIG. 10, the reinforcement learning unit 191 acquires one system requirement (step S301).

Then, the reinforcement learning unit 191 evaluates the difficulty of the obtained system requirement (step S302), and determines whether or not the system requirement is difficult based on the evaluation result (step S303). The method by which the reinforcement learning unit 191 evaluates the difficulty of the system requirement is not limited to a specific method. For example, the reinforcement learning unit 191 may determine that the system requirement is difficult when the scale of the graph showing the system requirement, such as the number of nodes included in the graph showing the system requirement, is equal to or larger than a predetermined threshold value.

Alternatively, the reinforcement learning unit 191 may perform the system design a plurality of times based on the system requirement obtained in step S101, and calculate the success rate by dividing the number of successful system designs by the total value of the number of successful system designs and the number of failures. Then, the reinforcement learning unit 191 may determine that the system requirement obtained in step S101 is difficult when the obtained success rate is less than a predetermined threshold value.

When it is determined that the system requirement is not difficult (step S303: NO), the reinforcement learning unit 191 executes the process of FIG. 9 (step S321). In this case, the reinforcement learning unit 191 sets the system requirement acquired in step S301 of FIG. 10, in step S201 of FIG. 9.

After step S321, the reinforcement learning device 11 ends the process of FIG. 10.

On the other hand, when it is determined in step S303 that the system requirement is difficult (step S303: YES), the part configuration information extraction unit 192 extracts the part of the system indicated by the system requirement obtained in step S301, and acquires the system requirement indicating the extracted part (step S311). The process of extracting the part of the system in step S311 can be performed as the process of extracting the subgraph of the graph showing the system requirement.

As will be described later, the part configuration information extraction unit 192 may divide the system indicated by the system requirement obtained in step S301 by network domain, and generate a system requirement for each divided portion. Alternatively, the part configuration information extraction unit 192 may divide the system indicated by the system requirement obtained in step S301 by layer, and generate a system requirement for each of the divided parts. Alternatively, the part configuration information extraction unit 192 may extract the partial graph of the abstract portion of the graph showing the system requirement obtained in step S301 as the system requirement.

Next, the reinforcement learning device 11 performs stepwise reinforcement learning by recursively executing the process of FIG. 10 for one of the system requirements obtained in step S311 (step S312). In this case, the reinforcement learning device 11 uses one of the system requirements obtained in step S311 as the system requirement acquired in step S301 of FIG. 10 to be executed recursively.

After step S312, the reinforcement learning unit 191 determines whether or not all of the part system requirements obtained in step S311 have been learned (step S313).

If it is determined that there is a system requirement (part system requirement) that has not been learned yet (step S313: NO), the process returns to step S312. In this case, the reinforcement learning device 11 recursively executes the process of FIG. 10 in step S312, and uses the system requirement that has not been learned yet, as a system requirement to be acquired in step S301, by the process of FIG. 10 of recursively executing in step S312.

On the other hand, when it is determined in step S313 that all of the part system requirements have been learned (step S313: YES), the reinforcement learning device 11 ends the process of FIG. 10.

In this way, the reinforcement learning device 11 recursively executes the process of FIG. 10, so that the part configuration information extraction unit 192 can combine a plurality of methods that extract a part of the system, enabling further simplification of the system.

For example, in step S311 in the first-stage execution (non-recursive execution) of the process of FIG. 10, the part configuration information extraction unit 192 may divide the system for each network domain. Then, in step S311 in the second stage execution (execution by one recursive call) of the process of FIG. 10, the part configuration information extraction unit 192 may further divide the system (part of system) for each layer. As a result, the reinforcement learning device 11 can divide the system for each network domain and each layer, and the individual divided parts of the system become smaller. Since each part is small, the possibility that the reinforcement learning unit 191 succeeds in system design is relatively high, and it is expected that reinforcement learning will proceed.

Next, the extraction of a part of the system by the part configuration information extraction unit 192 will be described.

<Division of a System Requirement Based on the Location of the Communication Network>

The part configuration information extraction unit 192 may divide the system requirement with the location of the communication network as a boundary.

Figure 11:
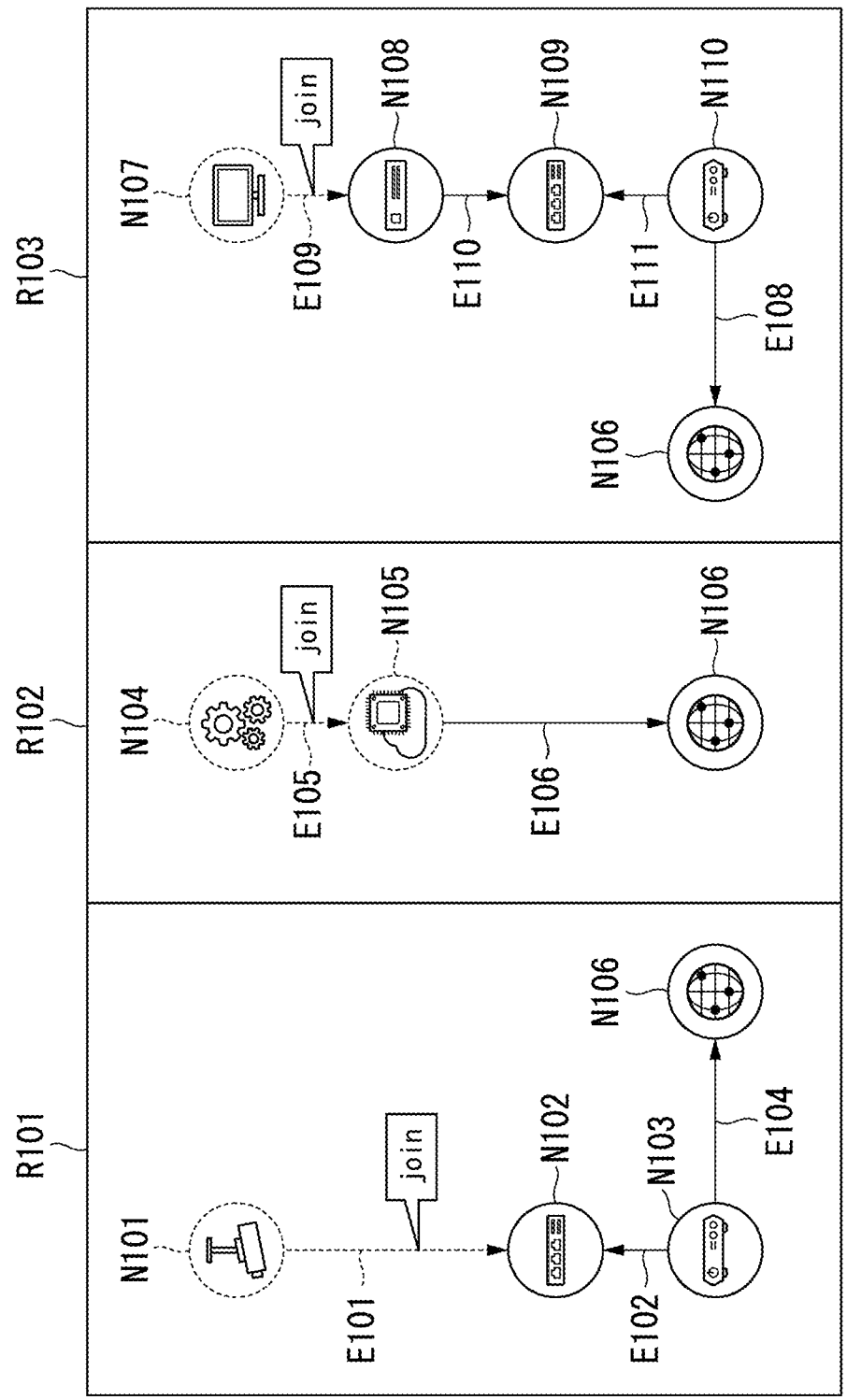
FIG. 11 is a diagram showing an example of system requirements divided for each network domain.

FIG. 11 is a diagram showing an example of system requirements divided for each network domain. FIG. 11 shows an example in which the part configuration information extraction unit 192 divides up the graph (system requirement) of FIG. 2 for each network domain.

The part configuration information extraction unit divides the system for each network domain by dividing the system with the network as the boundary. When dividing the graph showing the system requirement, the part configuration information extraction unit 192 divides the graph with the node showing the network as a boundary. In the example of FIG. 2, node N106 corresponds to a node indicating a network. The part configuration information extraction unit 192 acquires the three system requirements R101, R102, and R103 of FIG. 11 by dividing up the graph (system requirement) of FIG. 2 with the node N106 as a boundary.

Here, a case where the part configuration information extraction unit 192 divides the system with the WAN as a boundary will be described as an example. However the communication network which the part configuration information extraction unit 192 uses as the boundary of the division is not limited to a specific type of communication network. For example, the part configuration information extraction unit 192 may divide the system with a LAN (Local Area Network) as a boundary. Alternatively, the part configuration information extraction unit 192 may divide the system with the Internet as a boundary.

When a person creates a system requirement, it is generally considered that the system requirement is created by making each part connected to the communication network a functional coherence. In the case of the example of FIG. 11, the system requirement R101 is a system requirement of the subsystem for executing the camera function shown in the node N101 including the network communication required for the camera function. The system requirement R102 is a system requirement of the subsystem for executing the face recognition function shown in the node N104 including the network communication required for the face recognition function. The system requirement R103 is a system requirement of the subsystem for executing the monitor function shown in the node N107 including the network communication required for the monitor function.

In this way, it is expected that the part configuration information extraction unit 192 divides the system requirement with the communication network as a boundary so that people can easily understand the subsystems indicated by the obtained units. Since the obtained subsystem is easy for people to understand, it is relatively easy for people to verify whether or not the division of the system (system requirement) by the part configuration information extraction unit 192 is appropriate.

Also, since a subsystem that is easy for people to understand can be obtained, it is expected that the system design will be successful if the obtained subsystem is concretized in the same way as when a human designs the system. Therefore, by preparing a rule indicating the concretization that is to be considered to be performed when a human designs the system, as the conversion rule applied to the system requirement by the reinforcement learning unit 191 in step S203 of FIG. 9, it is expected that the reinforcement learning unit 191 will succeed in designing the subsystem. If the reinforcement learning unit 191 succeeds in designing the subsystem, it is expected that the learning of the evaluation model will proceed.

In addition, from the point that a rule may be prepared indicating a concretization that is to be considered to be performed when a human designs a system as a conversion rule applied to the system requirement by the reinforcement learning unit 191, a person who prepares a conversion rule can define the conversion rule relatively easily. The person who prepares the conversion rule may be, for example, the designer of the reinforcement learning device 11 or the user of the reinforcement learning device 11.

Figure 12:
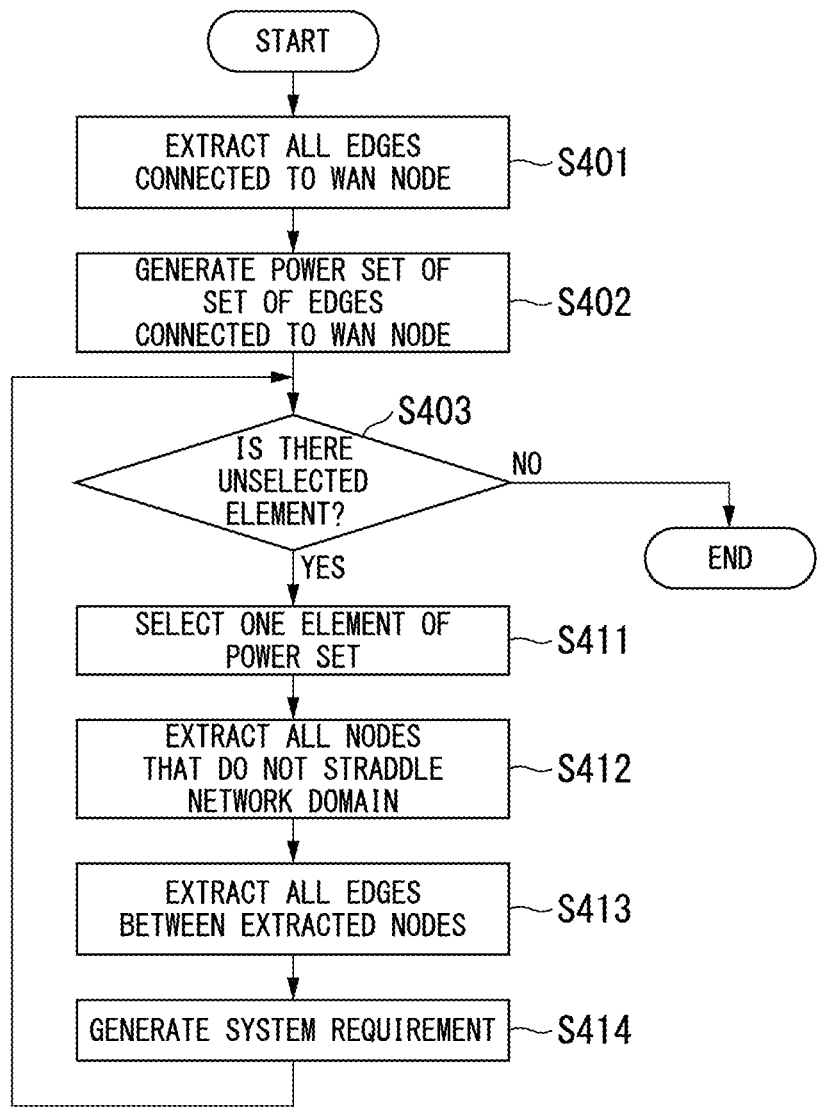
FIG. 12 is a flowchart showing an example of a processing procedure in which the reinforcement learning device according to the example embodiment divides a system requirement for each network domain.

FIG. 12 is a flowchart showing an example of a processing procedure in which the reinforcement learning device 11 divides the system requirement for each network domain.

In the process of FIG. 12, the part configuration information extraction unit 192 extracts all the edges connected to the WAN node (step S401). The WAN node referred to here is a node indicating WAN among the nodes of the graph showing a system requirement. In the example of FIG. 2, the node N106 corresponds to the example of the WAN node, and the edges E104, E106, and E108 correspond to the example of the edges connected to the WAN node.

Next, the part configuration information extraction unit 192 generates a power set of a set of edges connected to the WAN node (step S402). In the case of the example of FIG. 2, when the edges are indicated by the reference symbols in the figure, the set of edges connected to the WAN node is {E104, E106, E108}. Therefore, the power set of the set of edges connected to the WAN node is {{E104, E106, E108}, {E104, E106}, {E104, E108}, {E106, E108}, {E104}, {E106}, {E108}, φ}. Here φ indicates the empty set.

Next, the part configuration information extraction unit 192 determines whether or not there is an unselected element other than the empty set among the elements of the power set generated in step S402 (step S403).

When it is determined that there is no unselected element other than the empty set (step S403: NO), the reinforcement learning device 11 ends the process of FIG. 12.

On the other hand, when it is determined in step S403 that there is an unselected element (step S403: YES), the part configuration information extraction unit 192 selects one unselected element other than the empty set, from the elements of the power set generated in step S402 (step S411).

Then, the part configuration information extraction unit extracts all the nodes that the edge included in the element selected in step S411 can reach from the side not connected to the WAN node by following only the edge (and node) that does not straddle the network domain (step S412). The part configuration information extraction unit 192 may determine whether or not the edge straddles the network domain by referring to the attribute information of the edge. For example, the part configuration information extraction unit 192 may determine that an edge to which any of "http", "TCP", and "IP" is added as attribute information, is an edge that straddles a network domain, and determine that the other edges are edges that do not straddle the network domain.

Next, the part configuration information extraction unit 192 extracts all the edges between the nodes extracted in step S412 (step S413).

Then, the part configuration information extraction unit 192 combines the nodes obtained in step S412 and the edges obtained in step S413 with a connection relationship same as the connection relationship in the original system requirement, to generate a system requirement (Step S414).

After step S414, the process transitions to step S403.

According to the process of FIG. 12, the part configuration information extraction unit 192 obtains not only the system requirements of the individual subsystems obtained by dividing a system with the communication network serving as the boundary, but also the system requirements of the subsystems in which a plurality of subsystems are grouped.

In the case of the examples of FIG. 2 and FIG. 11, the part configuration information extraction unit 192 generates the system requirement R101 based on the element {E104} of the power set. Similarly, the part configuration information extraction unit 192 generates the system requirement R102 based on the element {E106} of the power set. The part configuration information extraction unit 192 generates the system requirement R103 based on the element {E108} of the power set.

Further, the part configuration information extraction unit generates the system requirements of the subsystem in which the subsystem shown in the system requirement R101 and the subsystem shown in the system requirement R102 are grouped, based on the elements of the power set {E104, E106}. Specifically, the part configuration information extraction unit 192 generates the system requirement shown in the subgraph of the graph of FIG. 2 that includes the nodes N101, N102, N103, N104, N105, and N106 and the edges E101, E102, E103, E104, E105, and E106.

Similarly, the part configuration information extraction unit 192 generates a system requirement of a subsystem in which the subsystem shown in the system requirement R101 and the subsystem shown in the system requirement R103 are grouped, based on the elements of the power set {E104, E108}. The part configuration information extraction unit 192 generates a system requirement of a subsystem in which the subsystem shown in the system requirement R102 and the subsystem shown in the system requirement R103 are grouped, based on the elements of the power set {E106, E108}.

In this way, the part configuration information extraction unit 192 can obtain system requirements of various scales by generating system requirements based on each element of the power set. The scale of the system requirement referred to here is the scale of the graph showing the system requirement. In general, the larger the scale of the system requirement, the more difficult it is for the reinforcement learning unit 191 to perform reinforcement learning using the system requirement (the frequency of successful system design is low, and the frequency of rewards is low).

Therefore, the reinforcement learning unit 191 may perform reinforcement learning based on each system requirement by using the system requirements generated by the part configuration information extraction unit 192 in ascending order of their scale. As a result, it is expected that the reinforcement learning unit 191 will learn more than the case where the reinforcement learning based on the system requirement of the entire system is performed without the reinforcement learning based on the system requirements of the subsystems.

Various methods can be used by the reinforcement learning unit 191 as a method for determining the scale of system requirement. For example, the reinforcement learning unit 191 may determine that the larger the number of nodes or edges in the graph showing the system requirement, or the total number of these, the larger the scale of the system requirement. Alternatively, the reinforcement learning unit 191 may determine that the larger the number of elements included in the elements of the power set used by the part configuration information extraction unit 192 when generating the system requirement, the larger the scale of the system requirement.

The reinforcement learning unit 191 may perform reinforcement learning using some of the system requirements of the plurality of system requirements generated by the part configuration information extraction unit in the process of FIG. 12.

For example, after the reinforcement learning unit 191 performs reinforcement learning using each of the system requirements based on the elements each containing only one element among the elements of the power set, reinforcement learning may be performed based on the system requirement based on the element having the largest number of elements among (belonging to) the elements of the power set. The system requirement based on the element having the largest number of elements among the elements of the power set is the system requirement of the entire system.

Further, the part configuration information extraction unit 192 may generate only system requirements based on some of the elements among the elements of the power set.

<Division of System Requirements Based on Layers>

The part configuration information extraction unit 192 may divide the system requirement based on the layers defined for the system.

Figure 13:
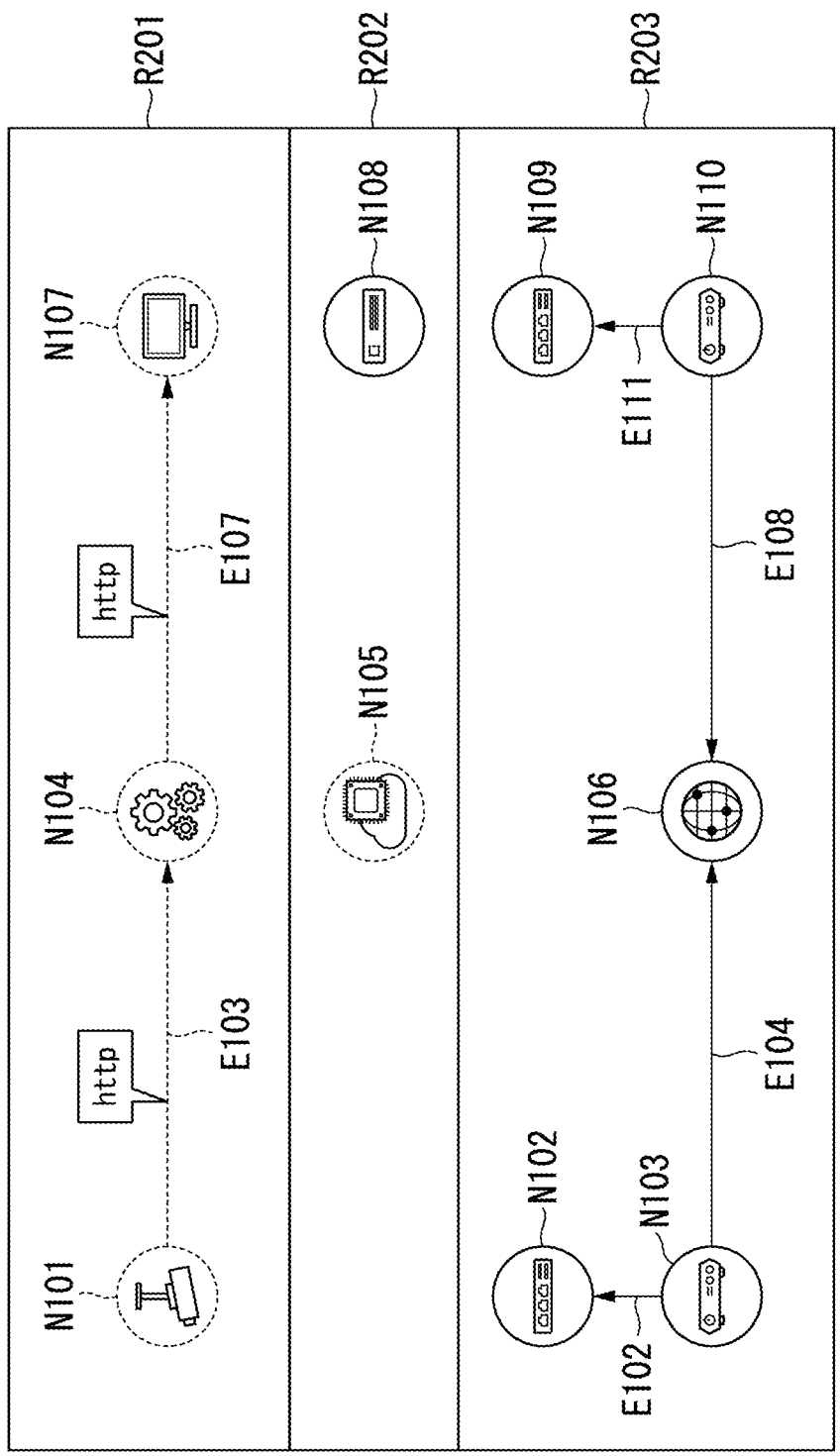
FIG. 13 is a diagram showing an example of system requirements divided for each layer.

FIG. 13 is a diagram showing an example of system requirements divided for each layer. In the example of FIG. 13, the part configuration information extraction unit 192 divides the system requirement shown in FIG. 2 into a system requirement of a functional layer, a system requirement of a platform layer, and a system requirement of a network layer. System requirement R201 is a system requirement for a subsystem included in the functional layer. System requirement R202 is a system requirement for a subsystem included in the platform layer. System requirement R203 is a system requirement for a subsystem included in the network layer.

However, the prescription (definition) of the layer used by the part configuration information extraction unit 192 is not limited to a specific one. For example, the part configuration information extraction unit 192 may divide the system requirements based on the prescription of known layers such as the OSI reference model (Open Systems Interconnection reference model).

When a human creates a system requirement, it is conceivable to create the system requirement with each part of each layer as a functional coherence. In particular, when the scale of the system is relatively large, it is conceivable to put the functions of the system to be built into the functions of each layer and determine the requirements of each part.

For example, when a human creates the system requirement shown in FIG. 2, it is conceivable they would determine the nodes that perform each function and the communication between the nodes as with the system requirement R201 of FIG. 13. Then they would determine the platform for constructing each function as in the system requirement R202, and then determine the configuration for communication between each function as in the system requirement R203.

In this way, it is expected that the part configuration information extraction unit 192 divides the system requirement according to the layers so that people can easily understand the subsystems indicated by the obtained units. Since the obtained subsystem is easy for people to understand, it is relatively easy for people to verify whether or not the division of system requirement by the part configuration information extraction unit 192 is appropriate.

Also, since a subsystem that is easy for people to understand can be obtained, it is expected that the system design will be successful if the obtained subsystem is concretized in the same way as when a human designs the system. Therefore, by preparing a rule indicating the concretization that is considered to be performed when a human designs the system, as the conversion rule applied to the system requirement by the reinforcement learning unit 191 in step S203 of FIG. 9, it is expected that the reinforcement learning unit 191 will succeed in designing the subsystem. If the reinforcement learning unit 191 succeeds in designing the subsystem, it is expected that the learning of the evaluation model will proceed.

In addition, from the point that, as a conversion rule applied to the system requirement by the reinforcement learning unit 191, a rule is prepared indicating a concretization that is considered to be performed when a human designs a system, a person who prepares a conversion rule can define the conversion rule relatively easily. In this case as well, the person who prepares the conversion rule may be, for example, the designer of the reinforcement learning device 11 or the user of the reinforcement learning device 11.

Figure 14:
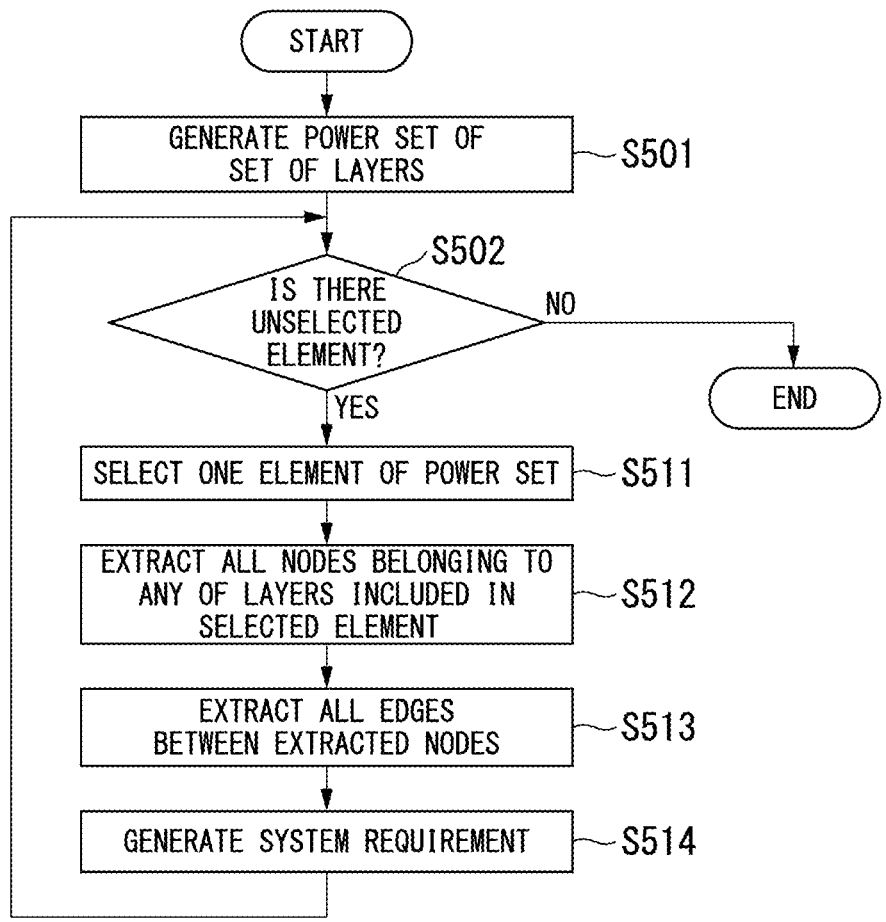
FIG. 14 is a flowchart showing an example of a processing procedure in which the reinforcement learning device according to the example embodiment divides a system requirement for each layer.

FIG. 14 is a flowchart showing an example of a processing procedure in which the reinforcement learning device 11 divides the system requirement into a system requirement of each layer.

In the process of FIG. 14, the part configuration information extraction unit 192 generates a power set of a set of layers determined to be used for dividing the system requirement (step S501). In the case of the examples of FIG. 2 and FIG. 13, the set of layers is {functional layer, platform layer, network layer}. Therefore, the power set of the set of layers is {{functional layer, platform layer, network layer}, {functional layer, platform layer}, {functional layer, network layer}, {platform layer, network layer}, {functional layer}, {platform layer}, {network layer}, φ}.

Next, the part configuration information extraction unit 192 determines whether or not there is an unselected element other than the empty set among the elements of the power set generated in step S501 (step S502).

When it is determined that there is no unselected element other than the empty set (step S502: NO), the reinforcement learning device 11 ends the process of FIG. 14.

On the other hand, when it is determined in step S502 that there is an unselected element other than the empty set (step S502: YES), the part configuration information extraction unit 192 selects one unselected element other than the empty set out of the elements of the power set generated in step S501 (step S511).

Then, the part configuration information extraction unit 192 extracts all the nodes belonging to any of the layers included in the element selected in step S511 (step S512).

Next, the part configuration information extraction unit 192 extracts all the edges between the nodes extracted in step S512 (step S513).

Then, the part configuration information extraction unit 192 combines the nodes obtained in step S512 and the edges obtained in step S513 with a connection relationship same as the connection relationship in the original system requirement, to generate a system requirement. (Step S514).

After step S514, the process transitions to step S502.

According to the process of FIG. 14, the part configuration information extraction unit 192 obtains not only the system requirements of the individual subsystems included in one layer, but also the system requirement of the subsystems in which a plurality of subsystems are grouped.

In the case of the examples of FIG. 2 and FIG. 13, the part configuration information extraction unit 192 generates the system requirement R201 based on the element {functional layer} of the power set. Similarly, the part configuration information extraction unit 192 generates the system requirement R202 based on the element {platform layer} of the power set. The part configuration information extraction unit 192 generates the system requirement R203 based on the element {network layer} of the power set.

Further, the part configuration information extraction unit generates the system requirement of the subsystems in which the subsystem shown in the system requirement R201 and the subsystem shown in the system requirement R202 are grouped, based on the elements of the power set {functional layer, platform layer}. Specifically, the part configuration information extraction unit 192 generates the system requirement shown in the subgraph of the graph of FIG. 2 that includes the nodes N101, N104, N105, N107, and N108, and the edges E103, E105, E107, and E109.

Similarly, the part configuration information extraction unit 192 generates a system requirement of a subsystem in which the subsystem shown in the system requirement R201 and the subsystem shown in the system requirement R203 are grouped, based on the elements of the power set {functional layer, network layer}. The part configuration information extraction unit 192 generates a system requirement of a subsystem in which the subsystem shown in the system requirement R202 and the subsystem shown in the system requirement R203 grouped, based on the elements of the power set {platform layer, network layer}.

In this case as well, the part configuration information extraction unit 192 can obtain system requirements of various scales by generating system requirements based on each element of the power set.

Therefore, the reinforcement learning unit 191 may perform reinforcement learning based on each system requirement by using the system requirements generated by the part configuration information extraction unit 192 in ascending order of their scale. As a result, it is expected that the reinforcement learning unit 191 will learn more than the case where the reinforcement learning based on the system requirement of the entire system is performed without the reinforcement learning based on the system requirements of the subsystems.

The reinforcement learning unit 191 may perform reinforcement learning using some of the system requirements of the plurality of system requirements generated by the part configuration information extraction unit in the process of FIG. 14.

For example, after the reinforcement learning unit 191 performs reinforcement learning using each of the system requirements based on the elements each containing only one element among the elements of the power set, reinforcement learning may be performed based on the system requirement based on the element having the largest number of elements among the elements of the power set. The system requirement based on the element having the largest number of elements among the elements of the power set is the system requirement of the entire system.

Further, the part configuration information extraction unit 192 may generate only system requirements based on some of the elements among the elements of the power set.

<Extraction of Abstract Parts of System Requirement>

The part configuration information extraction unit 192 may extract the abstract part from the system requirement.

Figure 15:
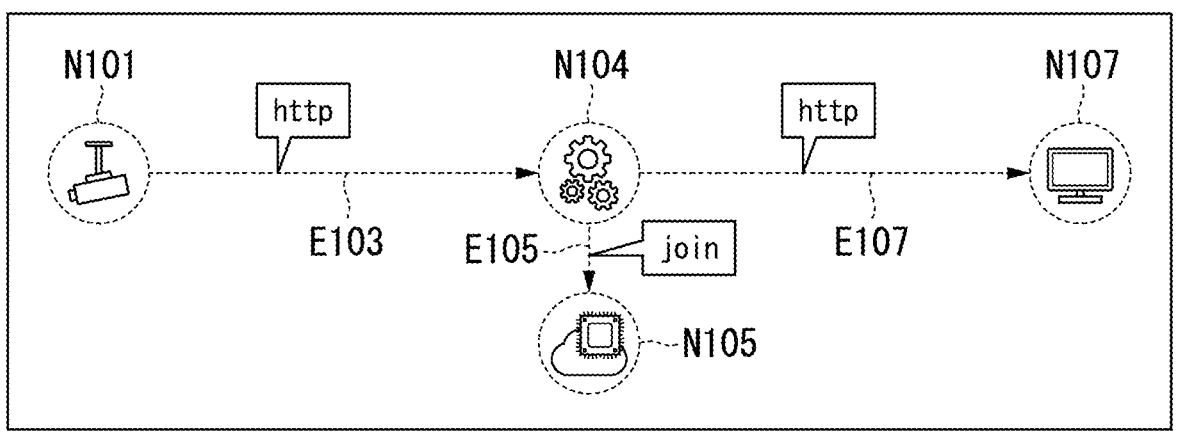
FIG. 15 is a diagram showing an example of an abstract part extracted from a system requirement.

FIG. 15 is a diagram showing an example of an abstract part extracted from the system requirement. FIG. 15 shows an example in which the part configuration information extraction unit 192 extracts an abstract part from the system requirement shown in FIG. 2. In the example of FIG. 2, the nodes N101, N104, N105, and N107 correspond to abstract nodes, and the part configuration information extraction unit 192 extracts the subgraph that includes these nodes and the edges between these nodes (edges E103, E105, and E107).

The part configuration information extraction unit 192 extracts the abstract part from among the system requirement, so that the originally concrete part is excluded from the system requirement. As a result, in the tree shown in FIG. 5, the size of the tree becomes relatively small because there is no option of designing by utilizing the originally concrete part, or designing by newly designing without utilizing it. This increases the frequency with which rewards are obtained in learning. In this respect, it is expected that the reinforcement learning of the reinforcement learning unit 191 will proceed.

After the reinforcement learning unit 191 performs reinforcement learning using the system requirement generated by extracting the abstract part from the system requirement given by the part configuration information extraction unit 192, reinforcement learning may be performed using the original system requirement (given system requirement).

Figure 16:
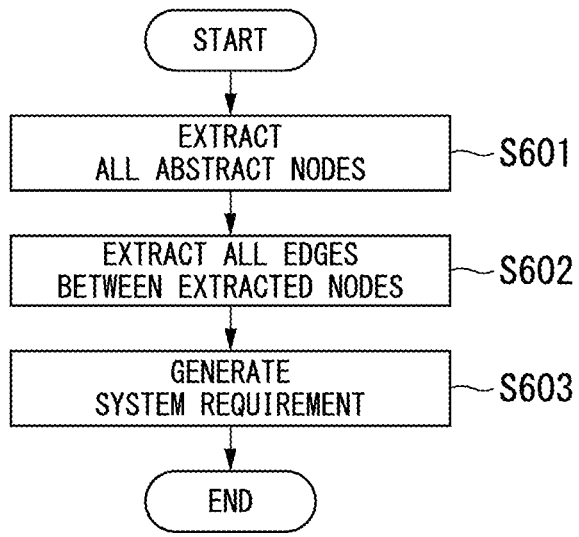
FIG. 16 is a flowchart showing an example of a processing procedure in which the reinforcement learning device according to the example embodiment extracts an abstract part from a system requirement.

FIG. 16 is a flowchart showing an example of a processing procedure in which the reinforcement learning device 11 extracts an abstract part from the system requirement.

In the process of FIG. 16, the part configuration information extraction unit 192 extracts all the abstract nodes included in the graph given as the system requirement (step S601). As mentioned above, in the case of the examples of FIG. 2 and FIG. 15, the abstract nodes are nodes N101, N104, N105, and N107.

Next, the part configuration information extraction unit 192 extracts all the edges between the abstract nodes extracted in step S601. As mentioned above, in the case of the examples of FIG. 2 and FIG. 15, the edges between the abstract nodes are edges E103, E105, and E107.

Then, the part configuration information extraction unit 192 combines the node obtained in step S601 and the edge obtained in step S602 with a connection relationship same as the connection relationship in the original system requirement, to generate a system requirement (Step S603).

After step S603, the reinforcement learning device 11 ends the process of FIG. 16.

As described above, the reinforcement learning unit 191 acquires the first information showing the system configuration in a graph. The part configuration information extraction unit 192 extracts the second information graphically showing the configuration of the part of the system indicated by the first information.

The reinforcement learning unit 191 can perform relatively complicated reinforcement learning using the first information, after performing relatively simple reinforcement learning using the second information. Therefore, it is expected that learning will proceed more than when reinforcement learning using the first information is performed without reinforcement learning using the second information.

Further, the part configuration information extraction unit 192 extracts the second information indicating the part configuration including at least one part of the system divided based on the network domain.

In this way, it is expected that people can easily understand the subsystem indicated by the obtained system requirement, by generating the system requirement as a result of the part configuration information extraction unit 192 dividing the system based on the network domain. Since the obtained subsystem is easy for people to understand, it is relatively easy for people to verify whether or not the division of the system (system requirement) by the part configuration information extraction unit 192 is appropriate.

Also, since a subsystem that is easy for people to understand can be obtained, it is expected that the system design will be successful if the obtained subsystem is concretized in the same way as when a person designs the system. Therefore, by preparing a rule indicating the concretization that is considered to be performed when a person designs the system, as the conversion rule applied to the system requirement by the reinforcement learning unit 191 in step S203 of FIG. 9, it is expected that the reinforcement learning unit 191 will succeed in designing the subsystem. As a result of the reinforcement learning unit 191 succeeding in designing the subsystem, it is expected that the learning of the evaluation model will proceed.

In addition from the point that, as a conversion rule applied to the system requirement by the reinforcement learning unit 191, a rule is prepared indicating a concretization (method of embodying an abstract part) that is considered to be performed when a person designs a system, a person who prepares a conversion rule can define the conversion rule relatively easily.

Further, the part configuration information extraction unit 192 extracts the second information indicating the configuration of the part including at least one part of the system divided based on the layer.

In this way, as a result of the part configuration information extraction unit 192 generating the system requirements by dividing the system based on the layers, it is expected that people can easily understand the subsystem indicated by the obtained system requirements. Since the obtained subsystems are easy for people to understand, it is relatively easy for people to verify whether or not the division of system requirement by the part configuration information extraction unit 192 is appropriate.

Also, since a subsystem that is easy for people to understand can be obtained, it is expected that the system design will be successful if the obtained subsystem is concretized in the same way as when a person designs the system. Therefore, by preparing a rule indicating the concretization that is considered to be performed when a person designs the system, as the conversion rule applied to the system requirement by the reinforcement learning unit 191 in step S203 of FIG. 9, it is expected that the reinforcement learning unit 191 will succeed in designing the subsystem. As a result of the reinforcement learning unit 191 succeeding in designing the subsystem, it is expected that the learning of the evaluation model will proceed.

In addition, from the point that, as a conversion rule applied to the system requirement by the reinforcement learning unit 191, a rule is prepared indicating a concretization that is considered to be performed when a person designs a system, a person who prepares a conversion rule can define the conversion rule relatively easily.

Further, the part configuration information extraction unit 192 extracts the second information indicating the configuration of the part where the system configuration is abstractly shown by the first information.

By extracting the abstract part of the system requirements by the part configuration information extraction unit 192, the scale of the system can be made relatively small, leaving the abstract part to be concretized in the system design. As a result, the reinforcement learning unit 191 can perform reinforcement learning using system requirements on a relatively small scale. In this respect, it is expected that the reinforcement learning of the reinforcement learning unit 191 will proceed.

Further, the part configuration information extraction unit 192 extracts the second information by further applying a second part extraction method to a part extracted by applying a first part extraction method to the first information. The first and second part extraction methods may be different from each other.

By applying a plurality of part extraction methods to the system requirement (first information), the part configuration information extraction unit 192 can obtain a system requirement (second information) that is smaller in scale than when only one part extraction method is applied. As a result, the reinforcement learning unit 191 can perform reinforcement learning using a system requirement with a relatively small scale. In this respect, it is expected that the reinforcement learning of the reinforcement learning unit 191 will proceed.

Figure 17:
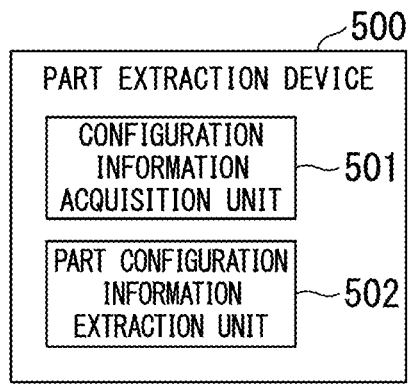
FIG. 17 is a diagram showing an example of a configuration of a part extraction device according to an example embodiment.

FIG. 17 is a diagram showing an example of the configuration of a part extraction device 500 according to an example embodiment. The part extraction device 500 shown in FIG. 17 includes a configuration information acquisition unit 501 and a part configuration information extraction unit 502. With such a configuration, the configuration information acquisition unit 501 acquires the first information showing the system configuration in a graph. The part configuration information extraction unit 502 extracts the second information graphically showing the configuration of the part of the system indicated by the first information.

The configuration information acquisition unit 501 corresponds to an example of a configuration information acquisition means. The part configuration information extraction unit 502 corresponds to an example of a part configuration information extraction means.

According to the part extraction device 500, when the evaluation model for system design is learned by reinforcement learning, then after performing relatively simple reinforcement learning using the second information, relatively complex reinforcement learning can be performed using the first information. As a result, it is expected that learning will proceed more than when reinforcement learning using the first information is performed without reinforcement learning using the second information.

Figure 18:
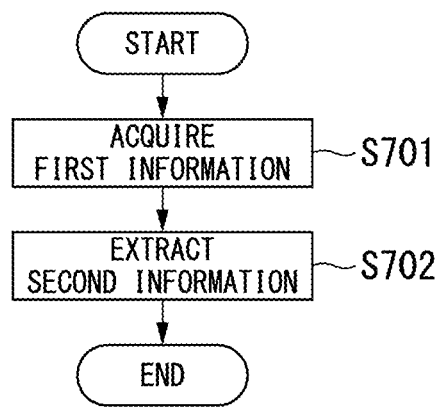
FIG. 18 is a flowchart showing an example of a processing procedure in a part extraction method according to an example embodiment.

FIG. 18 is a flowchart showing an example of a processing procedure in a part extraction method according to an example embodiment.

The process shown in FIG. 18 includes a configuration information acquisition step (step S701) and a part configuration information extraction step (step S702).

According to the process shown in FIG. 18, when the evaluation model for system design is learned by reinforcement learning, then after performing relatively simple reinforcement learning using the second information, relatively complex reinforcement learning can be performed using the first information. As a result, it is expected that learning will proceed more than when reinforcement learning using the first information is performed without reinforcement learning using the second information.

Figure 19:
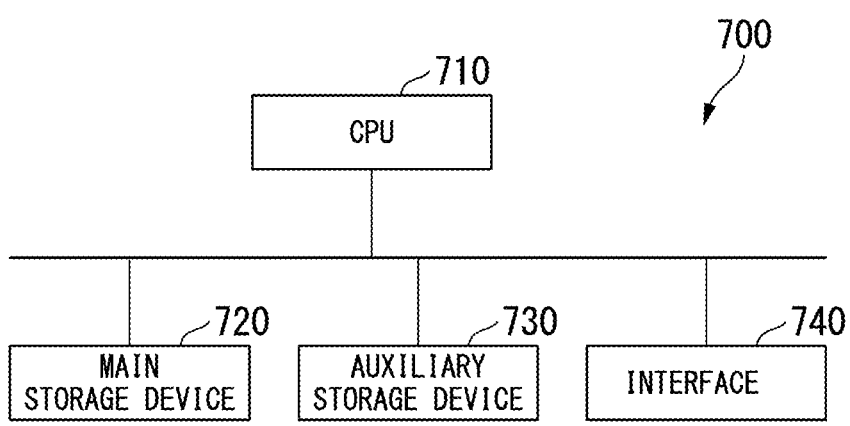
FIG. 19 is a schematic block diagram showing a configuration of a computer according to at least one example embodiment.

FIG. 19 is a schematic block diagram showing a configuration of a computer according to at least one example embodiment.

In the configuration shown in FIG. 19, the computer 700 includes a CPU 710, a main storage device 720, an auxiliary storage device 730, and an interface 740.

Any one or more of the above-mentioned reinforcement learning device 11, the system design device 12, and the part extraction device 500 may be mounted on the computer 700. In that case, the operation of each of the above-mentioned processing units is stored in the auxiliary storage device 730 in the form of a program. The CPU 710 reads the program from the auxiliary storage device 730, expands it to the main storage device 720, and executes the above processing according to the program. Further, the CPU 710 secures a storage area corresponding to each of the above-mentioned storage units, in the main storage device 720 according to the program.

When the reinforcement learning device 11 is mounted on the computer 700, the operations of the first control unit 190 and each unit thereof are stored in the auxiliary storage device 730 in the form of a program. The CPU 710 reads the program from the auxiliary storage device 730, expands it to the main storage device 720, and executes the above processing according to the program.

Further, the CPU 710 secures a storage area corresponding to the first storage unit 180, in the main storage device 720 according to the program.

Communication by the first communication unit 110 is executed by having the interface 740 have a communication function, and performing communication according to the control of the CPU 710.

When the system design device 12 is mounted on the computer 700, the operations of the second control unit 290 and each unit thereof are stored in the auxiliary storage device 730 in the form of a program. The CPU 710 reads the program from the auxiliary storage device 730, expands it to the main storage device 720, and executes the above processing according to the program.

Further, the CPU 710 secures a storage area corresponding to the second storage unit 280, in the main storage device 720 according to the program.

Communication by the second communication unit 210 is executed by having the interface 740 have a communication function, and performing communication according to the control of the CPU 710.

When the part extraction device 500 is mounted on the computer 700, the operations of the configuration information acquisition unit 501 and the part configuration information extraction unit 502 are stored in the auxiliary storage device 730 in the form of a program. The CPU 710 reads the program from the auxiliary storage device 730, expands it to the main storage device 720, and executes the above processing according to the program.

A program for realizing all or a part of the functions of the reinforcement learning device 11, the system design device 12, and the part extraction device 500 may be recorded on a computer-readable recording medium, and the processing of each part may be performed by loading the program recorded on this recording medium, into the computer system and executing it. The term "computer system" as used herein includes hardware such as an OS (operating system) and peripheral devices.

"Computer readable recording medium" includes storage devices such as flexible disks, magneto-optical disks, portable media such as ROM (Read Only Memory) and CD-ROM (Compact Disc Read Only Memory), and hard disks built into computer systems. Further, the above-mentioned program may be a program for realizing a part of the above-mentioned functions, and may be a program for realizing the above-mentioned functions in combination with a program already recorded in the computer system.

Although example embodiments of the present invention have been described in detail with reference to the drawings, the specific configuration is not limited to these example embodiments, and design changes and the like within a range not deviating from the gist of the present invention are also included.

The present invention has been described in detail above. However, the present invention is not limited to the example embodiments above, and various modifications may be made to the above configurations without departing from the scope of the invention.

What is claimed is:

1. A part extraction device comprising:
at least one memory configured to store instructions; and
at least one processor configured to execute the instructions to:
acquire first information that shows a configuration of a system in a graph format, wherein the system comprises a plurality of nodes and a plurality of edges, the plurality of nodes comprise two nodes, the plurality of edges comprise an edge that connects the two nodes, each of the plurality of nodes is a part constituting the system, and each of the plurality of edges indicates a relationship between two of the plurality of nodes;
determine whether each of the plurality of nodes and each of the plurality of edges belongs to the same network domain, wherein the determination comprises:
determining whether the edge straddles a network domain based on attribute information added to the edge;

determining that the two nodes connected by the edge belong to the same network domain when it is determined the edge does not straddle the network domain; and determining that the two nodes connected by the edge do not belong to the same network domain when it is determined the edge straddles the network domain; and extract, based on the determination, second information that shows a configuration of a part of the system in the graph format, from the first information, the second information comprising at least one of: 1) a part comprising an edge and a node that are determined to belong to the same network domain in the first information as a result of the determination; and 2) a combination of the part comprising the edge and the node.

2. A part extraction method comprising:

acquiring first information that shows a configuration of a system in a graph format, wherein the system comprises a plurality of nodes and a plurality of edges, the plurality of nodes comprise two nodes, the plurality of edges comprise an edge that connects the two nodes, each of the plurality of nodes is a part constituting the system, and each of the plurality of edges indicates a relationship between two of the plurality of nodes;

determining whether each of the plurality of nodes and each of the plurality of edges belongs to the same network domain, wherein the determination comprises:

determining whether the edge straddles a network domain based on attribute information added to the edge;

determining that the two nodes connected by the edge belong to the same network domain when it is determined the edge does not straddle the network domain; and determining that the two nodes connected by the edge do not belong to the same network domain when it is determined the edge straddles the network domain; and extracting, based on the determination, second information that shows a configuration of a part of the system in the graph format, from the first information, the second information comprising at least one of: 1) a part comprising an edge and a node that are determined to belong to the same network domain in the first information as a result of the determination; and 2) a combination of the part comprising the edge and the node.

3. A non-transitory computer readable recording medium storing a program for causing a computer to execute:

acquiring first information that shows a configuration of a system in a graph format, wherein the system comprises a plurality of nodes and a plurality of edges, the plurality of nodes comprise two nodes, the plurality of edges comprise an edge that connects the two nodes, each of the plurality of nodes is a part constituting the system, and each of the plurality of edges indicates a relationship between two of the plurality of nodes;

determining whether each of the plurality of nodes and each of the plurality of edges belongs to the same network domain, wherein the determination comprises:

determining whether the edge straddles a network domain based on attribute information added to the edge;

determining that the two nodes connected by the edge belong to the same network domain when it is determined the edge does not straddle the network domain; and determining that the two nodes connected by the edge do not belong to the same network domain when it is determined the edge straddles the network domain; and extracting, based on the determination, second information that shows a configuration of a part of the system in the graph format, from the first information, the second information comprising at least one of: 1) a part comprising an edge and a node that are determined to belong to the same network domain in the first information as a result of the determination; and 2) a combination of the part comprising the edge and the node.

4. The part extraction device according to claim 1, wherein determining whether the edge straddles the network domain comprises determining that the edge straddles the network domain when any one of "Hyper Text Transfer Protocol (http)", "Transmission Control Protocol (TCP)" and "Internet Protocol (IP)" is added to the edge as the attribute information.

5. The part extraction device according to claim 1, wherein at least one of the plurality of nodes is a camera, a network switch, a router, a cloud infrastructure, a wide area network, a monitor, a server device, or a work station.

6. The part extraction device according to claim 1, wherein at least one of the plurality of edges is a network connectivity.

* * * * *